United States Patent
Hayashihara

(10) Patent No.: US 6,898,412 B2
(45) Date of Patent: May 24, 2005

(54) SYSTEMS AND METHODS FOR CONTROLLING TRANSMISSION POWER TO REDUCE FREQUENCY INTERFERENCE

(75) Inventor: Mikio Hayashihara, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 580 days.

(21) Appl. No.: 09/810,668

(22) Filed: Mar. 19, 2001

(65) Prior Publication Data

US 2001/0027113 A1 Oct. 4, 2001

(30) Foreign Application Priority Data

Mar. 29, 2000 (JP) ........................................ 2000-090233

(51) Int. Cl.$^7$ ................................................ H04B 1/00
(52) U.S. Cl. .............................. 455/1; 455/522; 455/69; 455/437; 455/127.2
(58) Field of Search ............................ 455/1, 522, 69, 455/127.2, 437, 452.1, 453, 438

(56) References Cited

U.S. PATENT DOCUMENTS

| | | | | |
|---|---|---|---|---|
| 5,452,473 A | * | 9/1995 | Weiland et al. | 455/88 |
| 5,497,505 A | * | 3/1996 | Koohgoli et al. | 455/452.1 |
| 5,752,197 A | * | 5/1998 | Rautiola | 455/522 |
| 6,366,778 B1 | * | 4/2002 | Bender et al. | 455/442 |
| 6,611,506 B1 | * | 8/2003 | Huang et al. | 370/329 |

* cited by examiner

*Primary Examiner*—Nick Corsaro
(74) *Attorney, Agent, or Firm*—Finnegan, Henderson, Farabow, Garrett & Dunner, L.L.P.

(57) ABSTRACT

For use in a radiocommunication system using a frequency band close to a frequency band of a different radiocommunication system, a radiocommunication device, or a mobile, is controlled so that a maximum of transmission power is set according to an up-link frequency in use. The closer the up-link frequency in use is to the frequency band of the different radiocommunication system, the lower the maximum of transmission power is set.

16 Claims, 8 Drawing Sheets

SYSTEMS AND METHODS FOR CONTROLLING TRANSMISSION POWER TO REDUCE FREQUENCY INTERFERENCE

CROSS-REFERENCE TO RELATED APPLICATIONS

This application is based upon and claims the benefit of priority from the prior Japanese Patent Application No. 2000-090233, filed Mar. 29, 2000, the entire contents of which are incorporated herein by reference.

BACKGROUND OF THE INVENTION

The present invention relates to a wideband radiocommunication system such as CDMA (Code Division Multiple Access), and more specifically, a radio-communication device having an up-link power control function and a base station, which are used in the wideband communication system, and a method of controlling the up-link power.

In recent years, a radiocommunication system has begun to be put into practice which is based on the CDMA technique in which, by spreading an information-bearing transmit signal with a code to produce a wideband spread signal, channels can be assigned on a code-by-code basis. In 2001, a W-CDMA system will be put into practice which allows more information to be transmitted by making the spread spectrum wider than at present. However, the frequency band presently assigned to up-link signals in the W-CDMA in Japan is 1920 to 1980 MHz, which is contiguous to the frequency band, about 1893 to about 1920 MHz, assigned to the PHS (personal handyphone system) system which have already captured a large number of subscribers.

A power amplifier used in the transmitter of a radiocommunication device needs to be high in power efficiency even at the time of transmission at maximum power in order to make a lifetime of a battery as long as possible. However, this means that the power amplifier is used at an operating point close to saturation. With amplitude modulation involved as in the W-CDMA, the use of the power amplifier at the operating point close to saturation causes a transmit signal to distort, resulting in a wider frequency spectrum than is expected. Since in W-CDMA mobiles a transmit signal is spread at a chip rate of 3.84 Mcps, its frequency spectrum has a band of ±1.92 MHz below and above the carrier frequency fc. The spread signal is distorted in the power amplifier, spreading the spectrum up to frequencies about ±6 MHz above and below the carrier frequency fc of the transmit signal as shown in FIG. 1. If the transmit signal frequency in the W-CDMA mobile is close to 1920 MHz, the spread spectrum due to signal distortion by the power amplifier will extend to the frequency band of the PHS system, which can adversely affect the operation of the PHS system.

To avoid this, as shown in FIG. 2, one might suggest providing a guard band of a bandwidth of several megahertz in that portion of the up-link bandwidth of 1920 to 1980 MHz in the W-CDMA system which is contiguous to the frequency band assigned to the PHS system and prohibiting the use of frequencies in the guard band. In that case, however, the frequency utilization in the entire W-CDMA system would be reduced.

BRIEF SUMMARY OF THE INVENTION

Accordingly, the present invention is directed to method and apparatus that substantially obviates one or more of the problems due to limitations and disadvantages of the related art.

Another object of the present to provide a radiocommunication device, a base station, and an up-link power controlling method which avoid adversely affecting the operation of a radiocommunication system having a nearby frequency band assigned.

In accordance with the purpose of the invention, as embodied and broadly described, the maximum of transmission power of a radiocommunication device is decreased if its up-link channel frequency is close to the frequency band assigned to a different radiocommunication system.

According to one aspect of the present invention, if the up-link channel frequency is close to the frequency band assigned to a different radiocommunication system and the difference between the actual value and the maximum value of transmission power of the radiocommunication device is smaller than a threshold level, an operation of handover to another up-link channel for which the maximum of transmission power is allowed to be higher is performed.

Furthermore, in another aspect of the present invention, if the radiocommunication device is located near the base station and the actual value of up-link power is sufficiently lower than the maximum, an operation of handover to another up-link channel for which the maximum of transmission power is low is performed.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a radiocommunication device according to the present invention will now be described with reference to the accompanying drawings.

Figure 1:
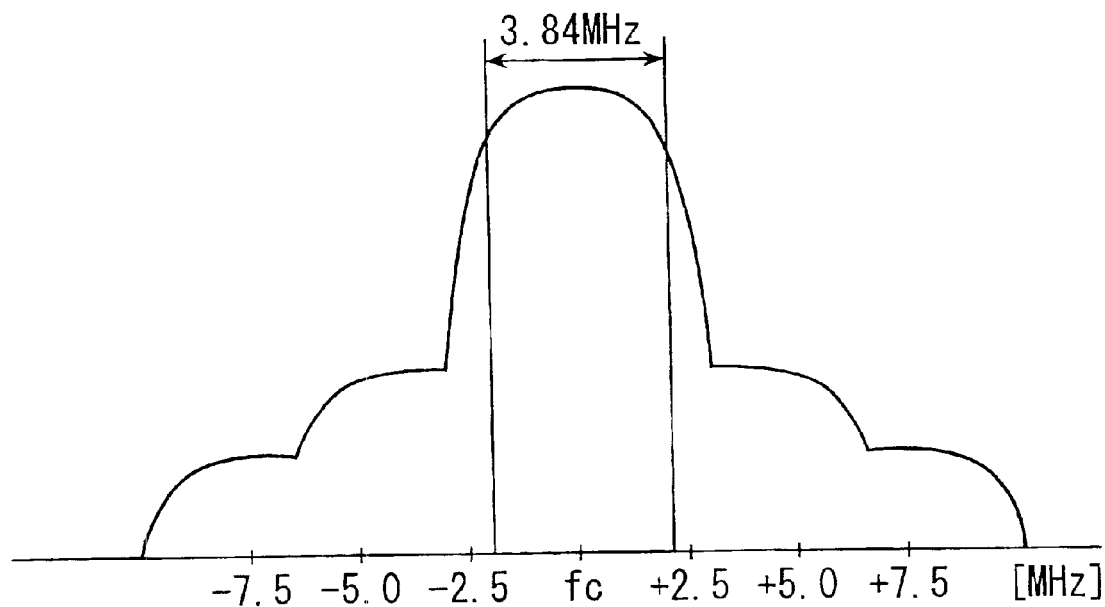
FIG. 1 is a diagram for use in explanation of spread spectrum due to an up-link signal in the W-CDMA system being distorted by a power amplifier used in a radiocommunication device.
Figure 2:
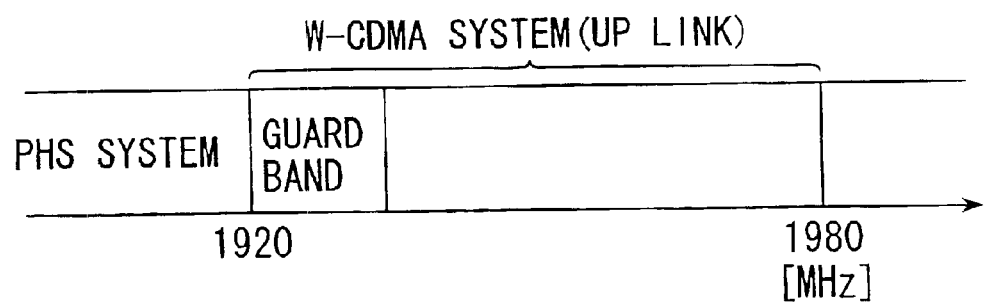
FIG. 2 is a diagram for use in explanation of a guard band in the up-link frequency band assigned to the W-CDMA system.
Figure 3:
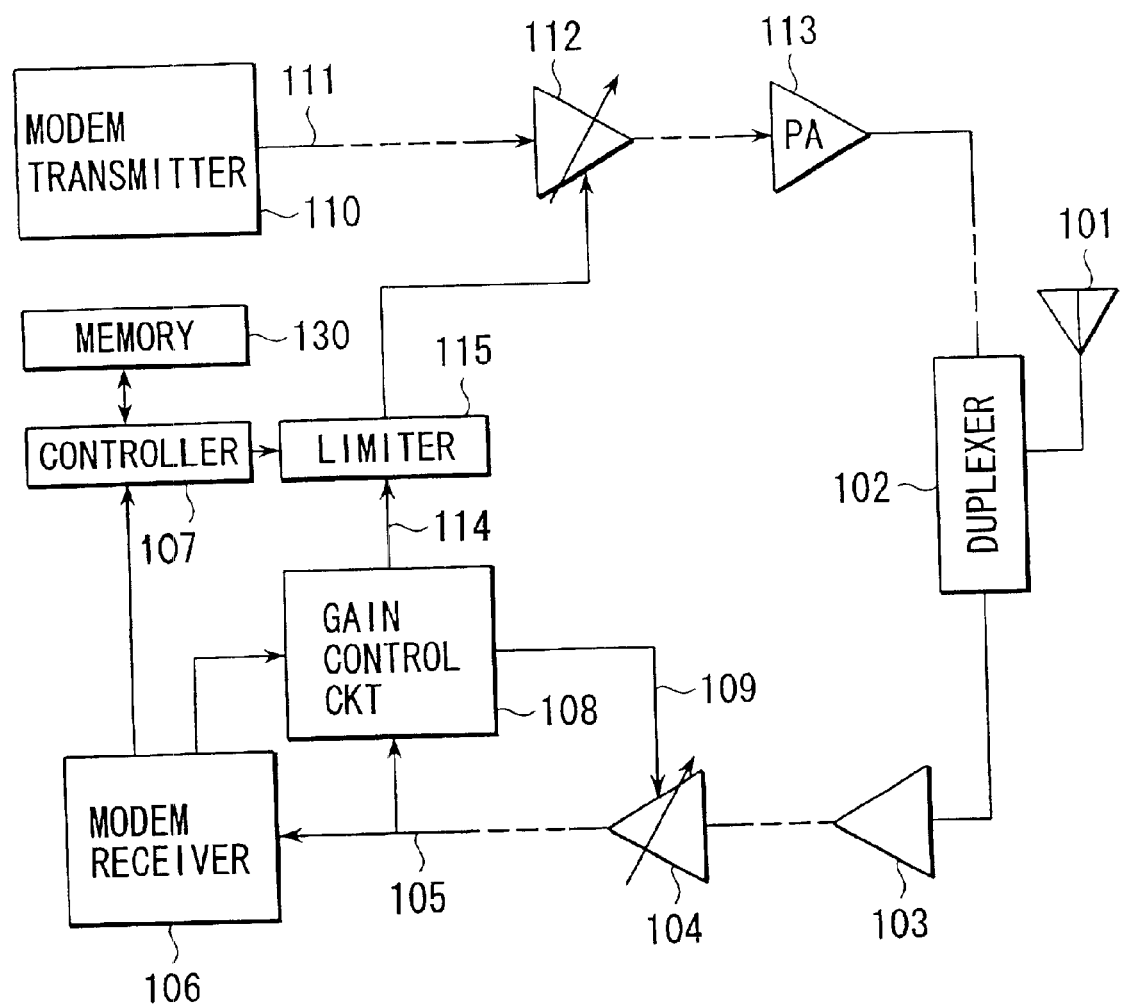
FIG. 3 is a schematic illustration of a radiocommunication device according to a first embodiment of the present invention.

Referring now to FIG. 3, there is illustrated in block diagram form a radiocommunication device (hereinafter referred to as a mobile) according to the first embodiment of the present invention.

A radio-frequency signal (down-link signal) transmitted from a base station (not shown) is received by an antenna 101 and then input through a duplexer 102 to a low-noise amplifier 103. An output signal of the amplifier 103, after, though not shown, passing through a filter for eliminating undesired signals outside the desired frequency band, a down-converter for frequency converting the received RF signal to an intermediate-frequency signal, and a filter for eliminating undesired signals apart in frequency from a desired signal, is applied to a gain controlled amplifier 104 where the output signal of the amplifier 103 is subjected to level adjustment. The level-adjusted signal is then converted into a baseband signal 105 by passing through a quadrature demodulator, a baseband filter, and a baseband amplifier which are not shown. The baseband signal 105 is input to a modem receiver 106 where the down-link signal is demodulated and control information is extracted from the down-link signal. Of the extracted information, information required for controlling the operation of the mobile is sent to a controller 107. To the controller 107 is connected a memory 130 storing a limit value-to-frequency mapping table which will be described later.

The baseband signal 105 is also sent to a gain control circuit 108, which produces a gain control signal 109 and controls the gain controlled amplifier 104 in the reception system so that the baseband signal has a desired fixed level.

A modem transmitter 110 in the transmission system spreads a transmit signal using a code to produce a transmit baseband signal 111. The transmit baseband signal 111 is converted by a baseband filter and a quadrature modulator not shown into an intermediate frequency signal, which in turn is subjected to level adjustment in a gain controlled amplifier 112. The output signal of the amplifier 112 is sent through a frequency converter for conversion into a radio frequency, an unwanted signal eliminating filter, and an amplifier to a power amplifier 113 where the output signal of the amplifier 112 is amplified up to a desired power level for transmission. The radio-frequency transmit signal is sent through a directional coupler and an isolator not shown to the duplexer 102 and then to the antenna 101 by which it is emitted as an up-link signal. The transmit frequency (the up-link channel frequency) is set as instructed by the base station.

The gain of the amplifier 112 of the transmission system is controlled by the base station. The base station monitors the received level of the up-link signal and sends a transmission gain control signal to the mobile. This control signal, adapted to instruct the mobile to increase or decrease the transmission gain of the amplifier 112, for example, by one step, is sent from the modem receiver 106 to the gain control circuit 108. In response to this control signal, the gain control circuit 108 produces a gain control signal 114 which is applied through the limiter 115 to the gain controlled amplifier 112 of the transmission system.

The operation of the mobile of the first embodiment, particularly the control of levels of transmit and receive signals, will be described. For control of the receive signal level, the received baseband signal 105 is sent to the gain control circuit 108, which in turn produces the reception gain control signal 109 to control the gain controlled amplifier 104 so that the received baseband signal is kept at a desired fixed level. Thereby, receive signals are kept at a fixed level at all times.

On the other hand, the adjustment of transmit signals in the gain controlled amplifier 112 in the transmission system is made as follows: If the mobile is distant from the base station, the mobile is required to transmit with high power in order to keep the up-link signal quality in the base station. Conversely, if the mobile is near the base station, the mobile is allowed to be low in transmission power. Thus, the base station monitors the up-link signal quality. If the quality is lower than is expected, the base station transmits information for instructing the mobile to increase its transmission power on a down-link signal. On the other hand, if the up-link signal quality is higher than is expected, the base station transmits information for instructing the mobile to decrease its transmission power in a down-link signal. The mobile extracts the instructing information in the modem receiver 106 and then sends the extracted information to the gain control circuit 108, which in turn changes the transmission gain control signal 114 so as to increase or decrease the transmission gain.

The transmission gain control signal 114 does not directly control the gain of the transmission gain controlled amplifier 112 but is applied thereto through the limiter 115. If the up-link transmission power required by the base station is too high, a transmit signal will be distorted in the power amplifier 113 with the result that the spectrum of the spread signal extends to interfere with nearby frequencies. In order to prevent the gain of the gain controlled amplifier 112 from becoming too high, the transmission gain control signal 114 is applied to the limiter 115.

Figure 4:
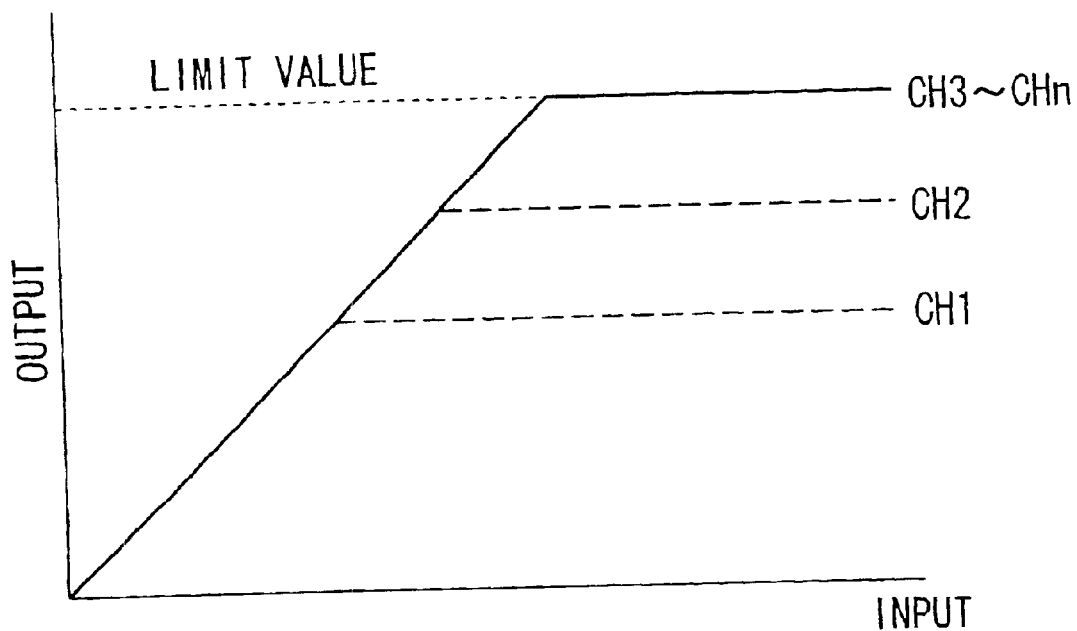
FIG. 4 is a diagram for use in explanation of the input-output characteristic of the limiter for a transmission gain control signal in the first embodiment.
Figure 5:
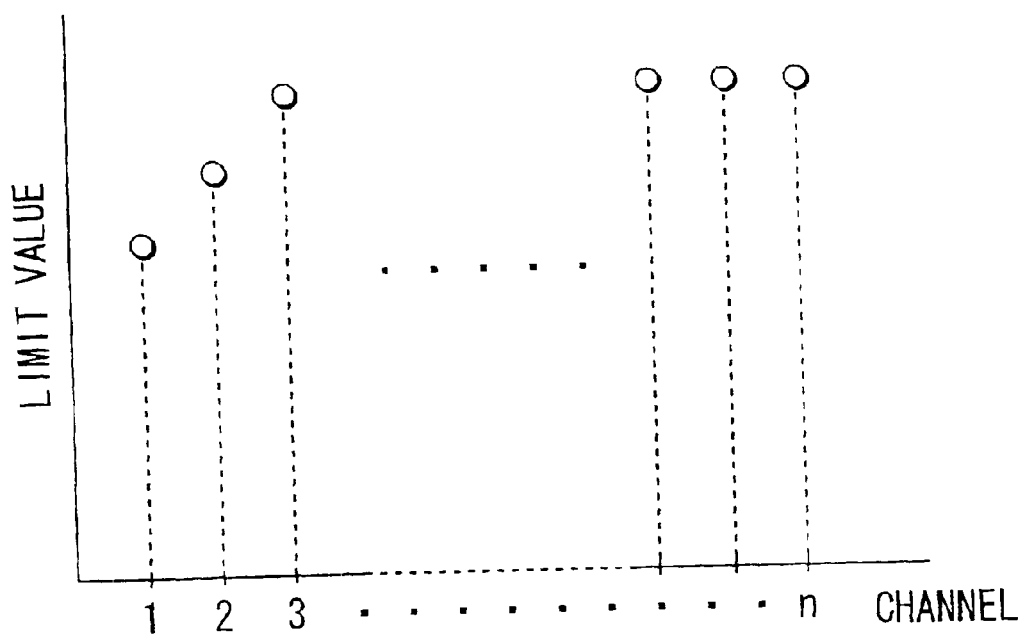
FIG. 5 shows an example of a relationship between channels and limit values in the limiter in the first embodiment.

The limiter 115 has such an input-output characteristic as shown in FIG. 4 and provides a constant output for inputs above a certain limit. Thus, this limit determines the maximum transmission power of the mobile. In this embodiment, the limit is set according to each channel. For this reason, such a channel-to-limit mapping table as shown in FIG. 5 is stored in the memory 130.

Here, the lower limit of the frequency band assigned to the present radiocommunication system is adjoined by the frequency band assigned to another radiocommunication system. In this case, the limits for channels are set such that the limit for channel 1 of the lowest frequency is the lowest, the limit increases as the channel number increases, and the limits for channels that are apart, to some extent, from channel 1 become constant.

Thus, for channels (channel 1 and channel 2) near the frequency band assigned to the other radiocommunication system, the controller 107 sets the maximum transmission power lower than with the other channels. For this reason, although up-link signals on those channels suffer from some degradation in power, the gain controlled amplifier 112 will not been driven into saturation; thus, the signals are not distorted and their frequency spectra are not extended over a wider range than is expected, preventing interference with the other system.

Although the channel versus limit relationship has been described as being stored in the memory 130 in the form of a table for later reference, the relationship may be included in a control program in the form of arithmetic operation equations. In this case, if a channel is determined in the mobile and a handover to the channel is then performed, the limit for that channel is determined based on the equation.

In the above description, the mobile changes the limit value of the limiter 115 according to the channel. However, the embodiment may be modified such that the channel-to-limit (maximum transmission power) mapping table as shown in FIG. 5 is set in the base station, and the base station specifies an up-link channel and the maximum transmission power for that channel in a down-link message to the mobile.

According to the first embodiment, as described above, for up-link channels that are close to the frequency band assigned to another radiocommunication system, the maximum transmission power is set lower than that at channels other than the channels close to another radiocommunication system and hence the transmission gain controlled amplifier 112 is allowed to operate without being driven into saturation. As a result, a transmit signal is prevented from becoming distorted, which in turn prevents its frequency spectrum from extending into the frequency band of the other radiocommunication system. That is, interference with the other communication system can be prevented.

Other embodiments of the radiocommunication device according to the present invention will be described. The same portions as those of the first embodiment will be indicated in the same reference numerals and their detailed description will be omitted.

Figure 6:
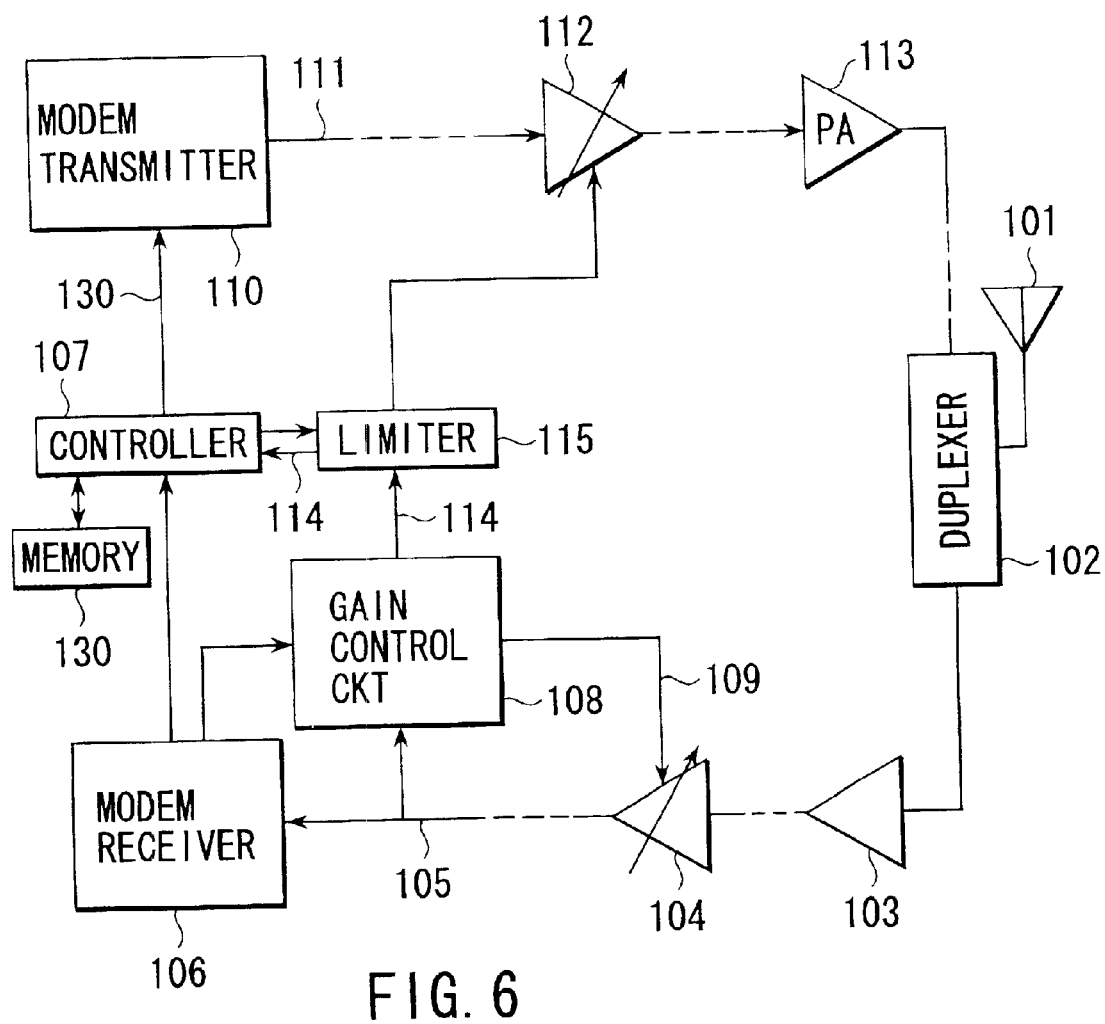
FIG. 6 is a schematic illustration of a radiocommunication device according to a second embodiment of the present invention.

FIG. 6 shows the arrangement of a mobile according to the second embodiment. The second embodiment is distinct from the first embodiment in that the controller 107 presents the difference between the limit value set in the limiter 115 and the actual value of the transmission gain control signal 114 from the gain control circuit 108, to the modem transmitter 110 as a transmission level margin message 130. The modem transmitter 110 transmits the transmission level margin message 130 to the base station on an up-link signal. The base station is responsive to the transmission level margin message to control handover of the mobile.

As described above, for up-link channels close to the frequency band assigned to another radiocommunication system, the maximum transmission power is set lower than with the other up-link channels. If the mobile is going away from the base station, therefore, there is a strong likelihood that an up-link signal will be disconnected earlier than a down-link signal. To continue communication, therefore, it is required to perform preferential handover to another frequency (channel). In this embodiment, since the base station is notified of the margin of the transmission power of the mobile with respect to the maximum transmission power, the base station can initiate the handover processing early using the transmission level margin message.

Figure 7:
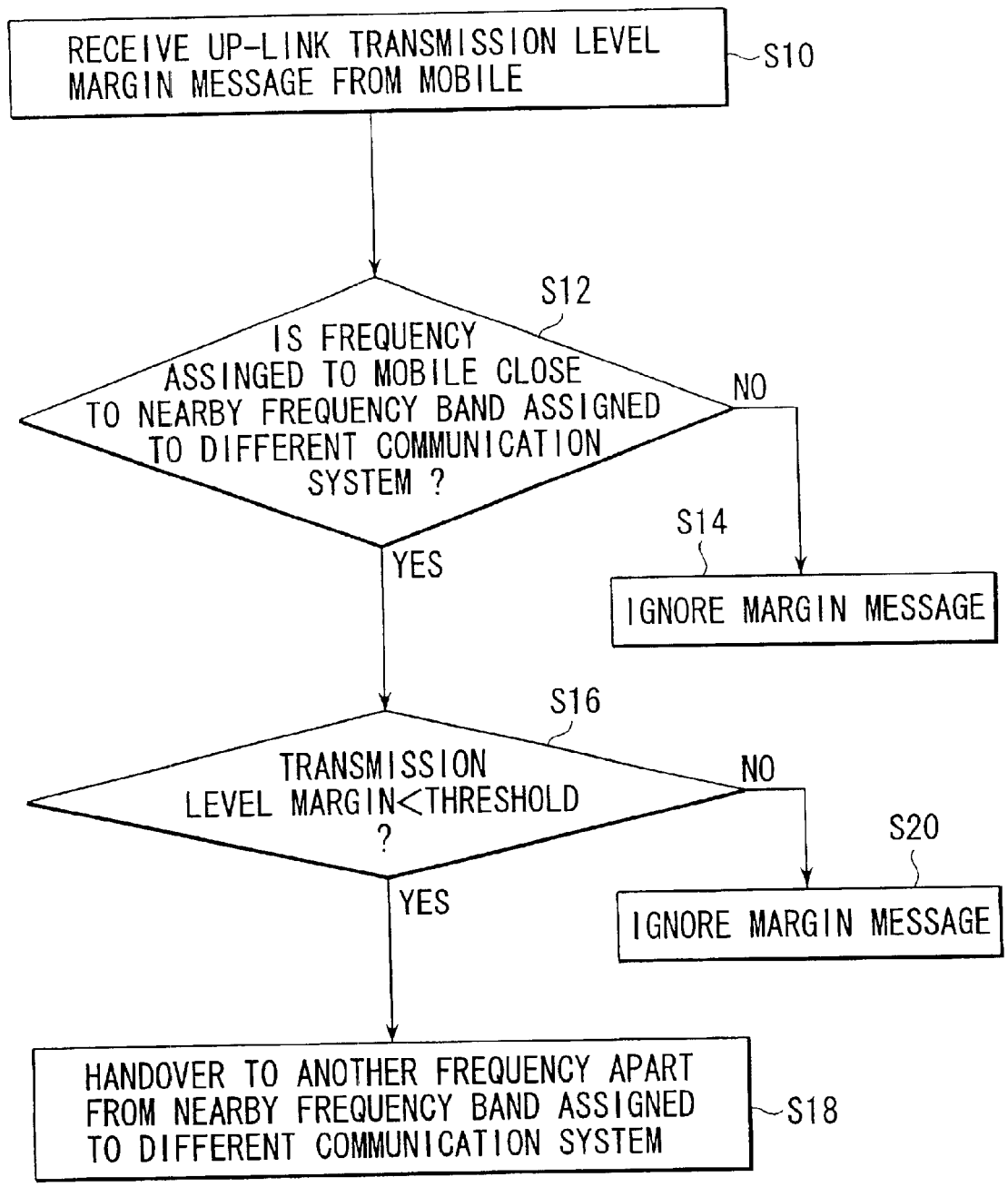
FIG. 7 shows an example of a process flow in the base station if it receives an up-link transmission margin message in the second embodiment.

FIG. 7 is a flowchart for the processing by the base station upon receipt of the transmission level margin message.

The mobile transmits a transmission level margin message. The base station receives the transmitted information in step S10 and then determines in step S12 whether or not the up-link channel frequency currently assigned to the mobile is included in a group of frequencies close to the frequency band assigned to a different radiocommunication system. If it is, then it is further determined in step S16 whether or not the transmission level margin is smaller than a threshold, i.e., whether or not the actual value of the transmission gain control signal 114 is close to the limit value set in the limiter 115. If it is, then handover is initiated in step S18 to a different channel frequency apart from the frequency band assigned to the different radiocommunication system, i.e., the frequency corresponding to a higher maximum level. The handover is a process by which the base station instructs the mobile to switch the up-link frequency currently in use to a different up-link frequency. The handover process may include an operation of monitoring channels in advance as usually practiced (a channel for handover is determined from the history of transmission quality). Thereby, stable handover is made possible.

If NO in steps S12 and S16, however, then the transmission level margin message is ignored in steps S14 and S20.

In this manner, communication interruption can be prevented even if the up-link signal quality is degraded as a result of the mobile going away from the base station.

A modification of the second embodiment will be described. The second embodiment has been described as the handover being triggered if the margin of the up-link transmission level (the difference between the setting and the maximum) from the mobile to the base station falls below a threshold (that is, the transmission level setting is close to the maximum). This is not restrictive. The handover may be triggered if the absolute value itself of the up-link transmission level exceeds a threshold.

Figure 8:
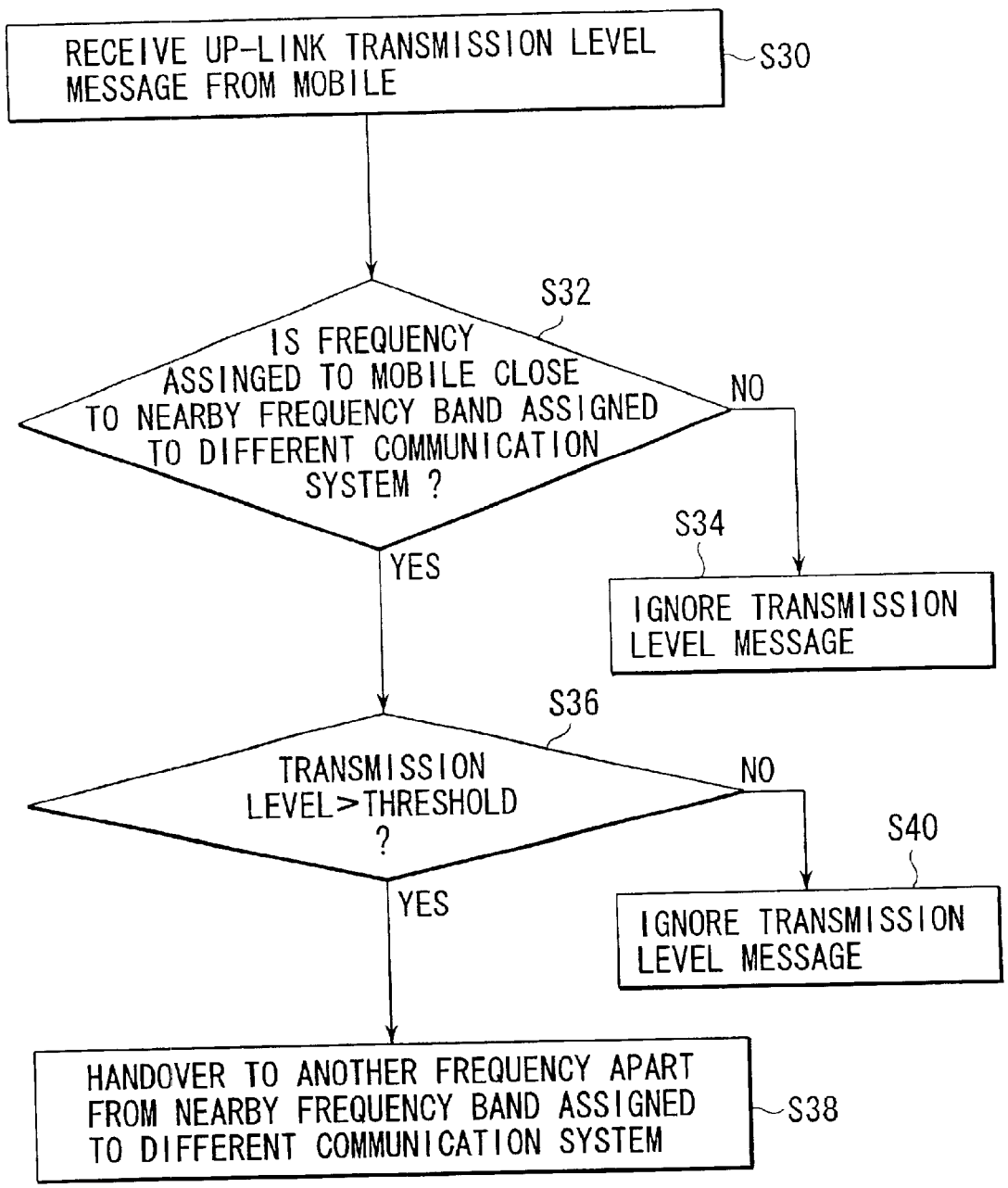
FIG. 8 shows a modification of the process flow of FIG. 7.

As shown in FIG. 8, if the mobile transmits a transmission level message, the base station receives this message in step S30 and then determines in step S32 whether or not the up-link channel frequency currently assigned to the mobile is included in a group of frequencies close to the nearby frequency band assigned to a different radiocommunication system. If it is, then it is further determined in step S36 whether or not the transmission level is greater than a threshold. If it is, then handover is initiated in step S38 to a different channel frequency apart from the nearby frequency band of the different radiocommunication system.

If NO in steps S32 and S36, however, then the transmission level information is ignored in steps S34 and S40.

This modification also allows communication interruption to be prevented even if the up-link signal quality is degraded as a result of the mobile going away from the base station.

Figure 9:
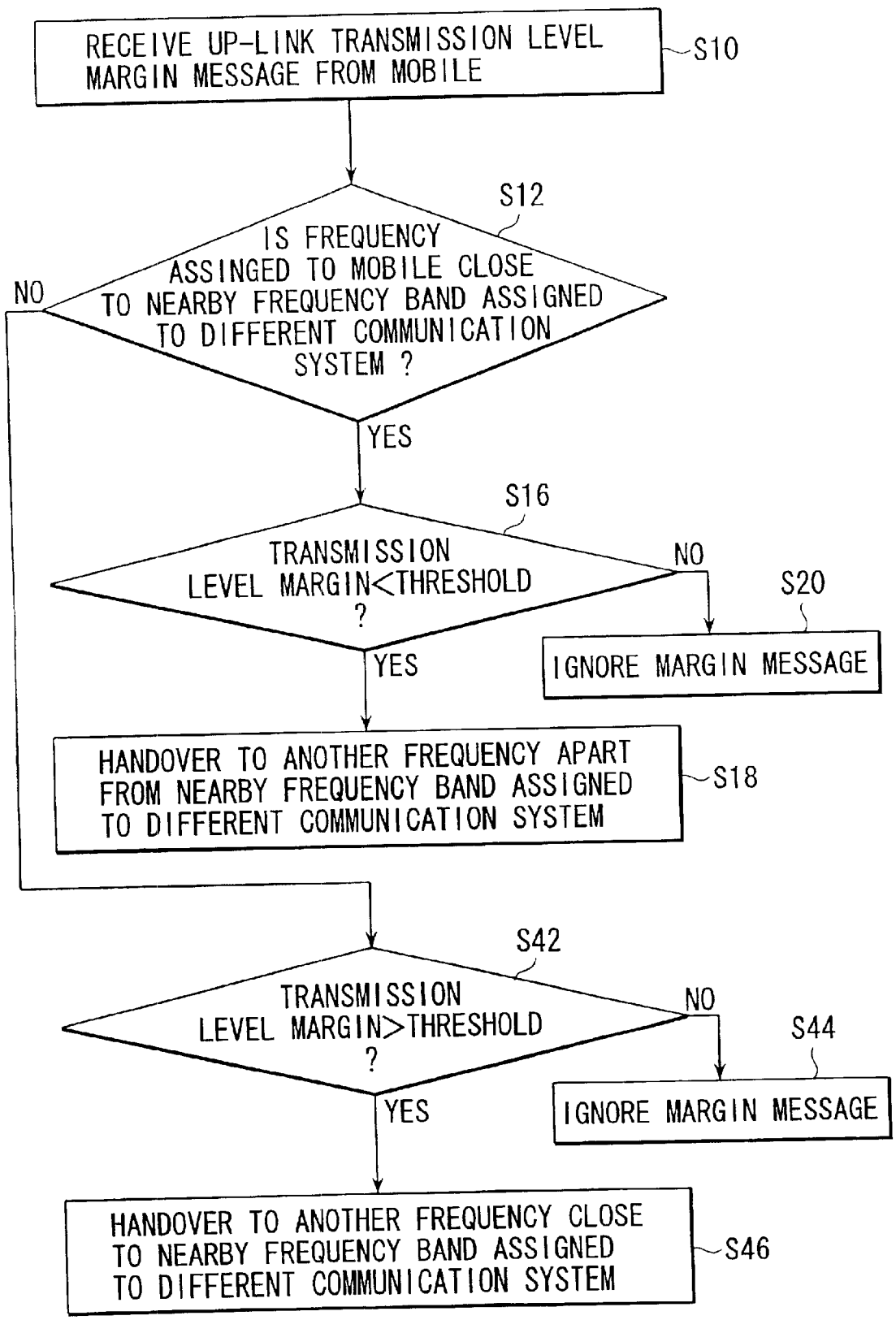
FIG. 9 shows an example of a process flow in the base station if it receives an up-link transmission level message in a third embodiment.

The third embodiment of the present invention will be described next. In the second embodiment, if mobiles go away from the base station, up-link frequencies are concentrated on frequencies apart from the nearby frequency band of a different radiocommunication system, which arrests the efficient utilization of frequency resources. FIG. 9 is a flowchart for the processing by the base station to solve that problem.

The mobile transmits a transmission level margin message. The base station receives this message in step S10 and then determines in step S12 whether or not the up-link channel frequency currently assigned to the mobile is included in a group of frequencies close to the frequency band assigned to a different radiocommunication system. If it is, then it is further determined in step S16 whether or not the transmission level margin is smaller than a threshold. If it is, then handover is initiated in step S18 to a different channel frequency apart from the frequency band of the different radiocommunication system, i.e., the channel frequency corresponding to a higher maximum level.

If NO in step S16, however, then the transmission level margin message is ignored in step S20.

In these respects the third embodiment remains unchanged from the second embodiment. In the third embodiment, if the condition is not met in step S12, i.e., if the up-link channel frequency assigned to the mobile is not included in a group of frequencies close to the nearby frequency band assigned to a different radiocommunication system, it is determined in step S42 whether or not the transmission level margin is greater than the threshold. If the margin is not greater than the threshold, then the transmission level margin message is ignored in step S42. If, however, the margin is greater than the threshold, then the base station initiates handover in step S46 to a channel frequency close to the nearby frequency band assigned to the different communication system in contrast with the second embodiment (or step S18).

Thus, since the direction of frequency change in handover is changed according to the margin, up-link frequencies can be prevented from concentrating on frequencies apart from the nearby frequency band of the different radiocommunication system and frequencies close to the nearby frequency band of the different radiocommunication system can also be accommodated by the mobile as long as the mobile is located close to the base station. Thus, the efficient utilization of frequency resources can be effected.

As with the second embodiment, a modification is also possible with the third embodiment. The modification of the third embodiment will be described next with reference to a flowchart of FIG. 10.

Figure 10:
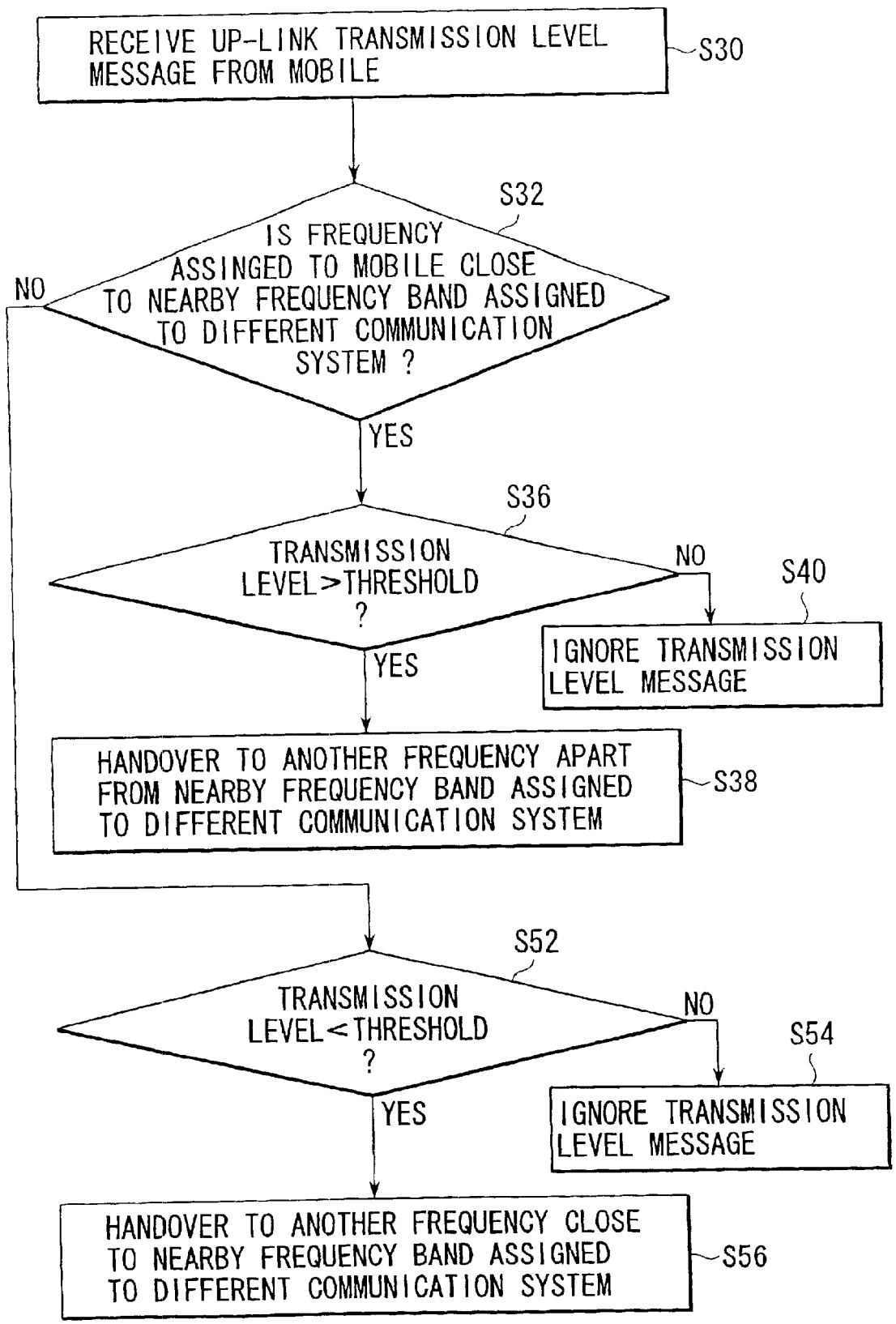
FIG. 10 shows a modification of the process flow of FIG. 9.

As shown in FIG. 10, if the mobile transmits a transmission level message, the base station receives this message in step S30 and then determines in step S32 whether or not the up-link channel frequency currently assigned to the mobile is included in a group of frequencies close to the nearby frequency band assigned to a different radiocommunication system. If it is, then it is further determined in step S36 whether or not the transmission level is greater than a threshold. If it is, then handover is initiated in step S38 to a different channel frequency apart from the nearby frequency band of the different radiocommunication system.

If, however, the condition is not met in step S32, i.e., if the up-link channel frequency assigned to the mobile is not included in a group of frequencies close to the nearby frequency band assigned to the different radiocommunication system, it is determined in step S52 whether or not the transmission level is lower than the threshold. If the transmission level is not lower than the threshold, then the transmission level message is ignored in step S54. If, however, the transmission level is lower than the threshold, then the base station initiates handover in step S56 to a channel frequency close to the nearby frequency band assigned to the different communication system in contrast with step S38.

This modification also allows up-link frequencies to be prevented from concentrating on frequencies apart from the nearby frequency band of a different radiocommunication system and frequencies close to the nearby frequency band of the different radiocommunication system to be accommodated by the mobile. Thus, the efficient utilization of frequency resources can be effected.

According to the present invention, as described above, the maximum transmission power of a mobile is set variable with the up-link frequency and, for up-link frequencies close to the nearby frequency band of a different radiocommunication system, the maximum transmission power is set low in comparison with that for the other up-link frequencies. The transmission gain controlled amplifier is therefore difficult to become saturated, which suppresses the spreading of the spectrum of an up-link signal with reduced interference with the different radiocommunication system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the example of the radiocommunication systems is not limited to the above example. Further, the third embodiment includes two judgment steps S16 and S46 in FIG. 9 and steps S36 and S56 in FIG. 10. It is possible to set the threshold in these two steps to different values in order to have a hysteresis characteristics. If these thresholds are set to the different values, it is desirable to make the threshold for margin of step S16 greater than that of step S42 and make the threshold for level of step S36 lower than that of step S52 in order to prevent the handover from being performed.

What is claimed is:

1. A radiocommunication device of a first radiocommunication system and connectable to a base station, the device comprising:

a gain controlled amplifier configured to amplify a transmit signal; and a limiter configured to set a first maximum value of an output of the gain controlled amplifier according to an up-link frequency specified by the base station, wherein the first maximum value corresponds to a first frequency of the first radiocommunication system that is close to a frequency band assigned to a second radiocommunication system and is set lower than maximum values of the gain controlled amplifier corresponding to other frequencies of the first radiocommunication system not close to the frequency band assigned to the second radiocommunication system.

2. The radiocommunication device according to claim 1, further comprising a memory configured to store a maximum value for each frequency in a preassigned frequency band and a controller configured to read the maximum value for a frequency specified by the base station from the memory and to supply the read maximum value to the limiter.

3. The radiocommunication device according to claim 1, further comprising:

a memory configured to store a function for the maximum value with each frequency in a preassigned frequency band as a parameter, and an arithmetic operation circuit configured to determine the maximum value according to the up-link frequency specified by the base station.

4. The radiocommunication device according to claim 1, wherein the maximum value of the limiter is set by the base station.

5. The radiocommunication device according to claim 1, further comprising a transmitter configured to transmit a difference between a setting value of an up-link signal transmission power specified by the base station and the set maximum value to the base station.

6. A transmission power control method for a radiocommunication device of a first radiocommunication system, the device having a gain controlled amplifiers comprising:

receiving an up-link frequency specified by a base station;

amplifying a transmit signal by a gain controlled amplifier; and setting a first maximum value of an output of the gain controlled amplifier according to the specified up-link frequency, wherein the first maximum value corresponds to a first frequency of the first radiocommunication system close to a frequency band assigned to a second radiocommunication system and is lower than other maximum values of the gain controlled amplifier corresponding to other frequencies of the first radiocommunication system not close to the frequency band assigned to the second radiocommunication system.

7. A base station for use in a radiocommunication system having a frequency band close to the frequency band assigned to a different radiocommunication system, the base station communicating with a radiocommunication device in which the maximum of its transmission power is variably set according to an up-link frequency specified by the base station, the base station comprising:

a receiver configured to receive a difference between an actual setting and the maximum of the transmission power from the radiocommunication device;

a determination section configured to determine whether the difference is smaller than a threshold; and a handover section configured to, if the difference is smaller than the threshold, switching the up-link frequency to another up-link frequency that is further from the frequency band of the different radiocommunication system.

8. The base station according to claim 7, wherein, if the current up-link frequency is close to the frequency band assigned to the different radiocommunication system and the difference is smaller than the threshold, said handover section switches the current up-link frequency to an up-link frequency which is further from the frequency band assigned to the different radiocommunication system.

9. The base station according to claim 7, wherein, if the difference is greater than the threshold, the handover section switches the current up-link frequency to an up-link frequency that is closer to the frequency band assigned to the different radiocommunication system.

10. The base station according to claim 7, wherein, if the current up-link frequency is close to the frequency band assigned to the different radiocommunication system and the difference is smaller than the threshold, the handover section switches the current up-link frequency to an up-link frequency which is further from the frequency band assigned to the different radiocommunication system, and if the current up-link frequency is not close to the frequency band assigned to the different radiocommunication system and the difference is greater than the threshold, the handover section switches the current up-link frequency to an up-link frequency that is closer to the frequency band assigned to the different radiocommunication system.

11. A base station for use in a radiocommunication system having a frequency band close to the frequency band assigned to a different radiocommunication system, the base station communicating with a radiocommunication device in which the maximum of its transmission power is variably set according to an up-link frequency specified by the base station, the base station comprising:

a determination section configured to determine whether the transmission power of the radiocommunication device is greater than a threshold; and a handover section configured to, if the transmission power is greater than the threshold, switch from the up-link frequency to another up-link frequency that is further from the frequency band of the different radiocommunication system.

12. The base station according to claim 11, wherein, if the current up-link frequency is close to the frequency band assigned to the different radiocommunication system and the transmission power is greater than the threshold, the handover section switches the current up-link frequency to an up-link frequency which is further from the frequency band assigned to the different radiocommunication system.

13. The base station according to claim 11, wherein, if the transmission power is not greater than the threshold, the handover section switches the current up-link frequency to an up-link frequency that is closer to the frequency band assigned to the different radiocommunication system.

14. The base station according to claim 11, wherein, if the current up-link frequency is close to the frequency band assigned to the different radiocommunication system and the transmission power is greater than the threshold, the handover section switches the current up-link frequency to an up-link frequency which is further from the frequency band assigned to the different radiocommunication system, and if the current up-link frequency is not close to the frequency band assigned to the different radiocommunication system and the transmission power is not greater than the threshold, the handover section switches the current up-link frequency to an up-link frequency that is closer to the frequency band assigned to the different radiocommunication system.

15. A radiocommunication device of a first radiocommunication system and connectable to a base station comprising:

a gain controlled amplifier configured to amplify a transmit signal; and a limiter configured to set a maximum value of an output of the gain controlled amplifier according to an up-link frequency specified by the base station, wherein the maximum value of the gain controlled amplifier is reduced when the specified up-link frequency is close to a frequency band assigned to a second radiocommunication system.

16. A radiocommunication device of a first radiocommunication system and connectable to a base station comprising:

a gain controlled amplifier configured to amplify transmit signals; and a limiter configured to set a maximum output of the gain controlled amplifier for transmission channels associated with the first radiocommunication system according to an up-link frequency specified by the base station, wherein the limiter sets a first maximum value of the gain controlled amplifier for a first channel of the first radiocommunication system that is close to a frequency band assigned to a second radiocommunication system, the first maximum value lower than a second maximum value of the gain controlled amplifier corresponding to a second channel of the first radiocommunication system that is not close to the frequency band assigned to the second radiocommunication system.

* * * * *

UNITED STATES PATENT AND TRADEMARK OFFICE
CERTIFICATE OF CORRECTION

PATENT NO. : 6,898,412 B2
DATED : May 24, 2005
INVENTOR(S) : Hayashihara

It is certified that error appears in the above-identified patent and that said Letters Patent is hereby corrected as shown below:

Column 8,
Line 63, change "amplifiers" to -- amplifier, --.

Signed and Sealed this

Twenty-third Day of August, 2005

JON W. DUDAS
*Director of the United States Patent and Trademark Office*